United States Patent [19]

Kishi

[11] Patent Number: 5,694,489
[45] Date of Patent: Dec. 2, 1997

[54] IMAGE SIGNAL PROCESSING APPARATUS WITH NO CHANGE OF SIGNAL PROCESSING MODE IN COMPRESSION/ EXPANSION PROCESSING LOOP

[75] Inventor: Kenji Kishi, Yokohama, Japan

[73] Assignee: Olympus Optical Co., Ltd., Tokyo, Japan

[21] Appl. No.: 534,474

[22] Filed: Sep. 27, 1995

[30] Foreign Application Priority Data

Oct. 20, 1994 [JP] Japan ................. 6-255380

[51] Int. Cl.$^6$ .................. G06K 9/36; G06K 9/46
[52] U.S. Cl. .......... 382/233; 382/236; 382/250; 382/268; 382/261; 348/420
[58] Field of Search ............ 382/233, 232, 382/236, 246, 250, 268, 260, 261, 264; 348/420, 400, 401, 409, 415, 629; 358/433, 430, 447; 364/724.12, 724.16, 724.19

[56] References Cited

U.S. PATENT DOCUMENTS

| | | | |
|---|---|---|---|
| 4,754,492 | 6/1988 | Malvar | 348/403 |
| 4,769,826 | 9/1988 | Kubo et al. | 375/240 |
| 4,941,043 | 7/1990 | Jass | 348/404 |
| 4,951,157 | 8/1990 | Koh et al. | 358/433 |
| 5,093,872 | 3/1992 | Tutt | 382/243 |
| 5,099,325 | 3/1992 | Artieri et al. | 348/420 |
| 5,210,623 | 5/1993 | Weldy | 358/458 |
| 5,229,864 | 7/1993 | Moronaga et al. | 358/433 |
| 5,311,310 | 5/1994 | Jozawa et al. | 348/416 |
| 5,351,083 | 9/1994 | Tsukagoshi | 348/384 |
| 5,367,629 | 11/1994 | Chu et al. | 382/253 |
| 5,384,849 | 1/1995 | Jeong | 348/404 |
| 5,475,434 | 12/1995 | Kim | 348/420 |

FOREIGN PATENT DOCUMENTS

| | | |
|---|---|---|
| 63-198420 | 8/1988 | Japan . |
| 63-246088 | 10/1988 | Japan . |
| 1-311782 | 12/1989 | Japan . |

OTHER PUBLICATIONS

IEEE Transactions on Acoustics, Speech, and Signal Processing, vol. 37, No. 4, Apr. 1989, "The Lot: Transform Coding Without Blocking Effects", Henrique S. Malvar et al.

*Primary Examiner*—Leo Boudreau
*Assistant Examiner*—Phuoc Tran
*Attorney, Agent, or Firm*—Frishauf, Holtz, Goodman, Langer & Chick

[57] ABSTRACT

A DCT circuit converts a specific block scanning signal into DCT coefficients. An encoder quantizes and Huffman-codes the image signal converted into DCT coefficients to compress it. A code memory stores the compressed image data obtained by quantizing and Huffman-coding a specific block scanning signal at the encoder. An IDCT circuit Huffman-decodes and inverse-quantizes the data read from the code memory and converts it into image data. An in-block horizontal scanning/in-block vertical scanning conversion circuit converts the image data into an in-block vertical scanning signal. An adaptive convolution filter effects the horizontal filtering of the in-block vertical scanning signal to remove the distortion of block boundary. An in-block vertical scanning/in-block horizontal scanning conversion circuit converts the image signal from which distortion has been removed into horizontal scanning direction. An adder circuit reconstructs and outputs the original image.

10 Claims, 8 Drawing Sheets

RASTER SCANNING

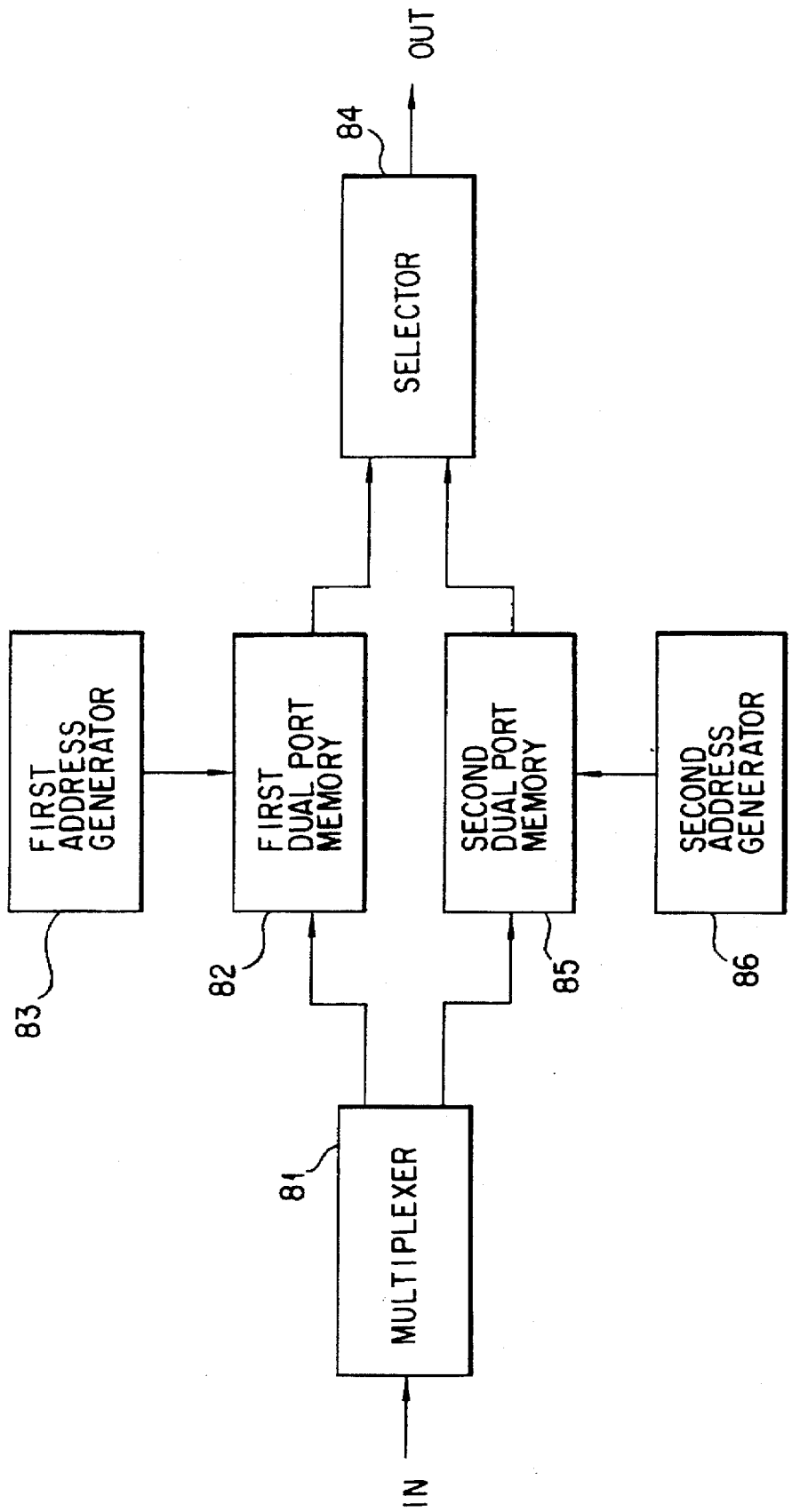
F I G. 9

IMAGE SIGNAL PROCESSING APPARATUS WITH NO CHANGE OF SIGNAL PROCESSING MODE IN COMPRESSION/ EXPANSION PROCESSING LOOP

BACKGROUND OF THE INVENTION

1. Field of the Invention

This invention generally relates to an image signal processing apparatus, and more particularly to a image signal processing apparatus which easily eliminates block distortion developed in organizing a digital image signal into blocks and performing a compression/expansion process.

2. Description of the Related Art

Generally, the image signal obtained by shooting an image with an imaging device and photoelectrically converting the image, is recorded or transferred, it has undergone various image signal processes.

A typical image signal processing unit is such that the digitized image signal is compressed to make the volume of data smaller and the smaller volume of data is recorded on a recording medium, and when it is used, the compressed image data is read from the recording medium and expanded to restore the original image signal.

FIG. 5 shows the configuration of an image signal processing apparatus disclosed in U.S. patent application Ser. No. 08/237,378, now U.S. Pat. No. 5,563,662, filed by the same applicant as that of the present application.

The details of the algorithm for filtering by a convolution filter to remove the distortion of block boundary in the image signal processing apparatus have been disclosed in U.S. patent application Ser. No. 08/238,983, now U.S. Pat. No. 5,625,714, assigned to the same assignee as that of the present application. The explanation is assumed to be incorporated here and a detailed explanation of the algorithm will be omitted.

Generally, a two-dimensional input image signal is taken in as a raster signal by raster scanning as shown in FIG. 6A and the raster signal is converted into a one-dimensional signal.

To organize one frame of image signal into blocks to compress the image signal in blocks, the image signal is converted by a raster/block conversion circuit 21 into an in-block horizontal block scanning signal (e.g., block units of 8 pixels×8 pixels) as shown in FIG. 6B.

As shown in FIG. 7, the structure of the image signal is such that at least one intraframe coding frame (I frame) intervenes between a plurality of intraframe coding frames (P frames) periodically with respect to time.

The processing of the intraframe coding frame (I frame) differs from that of the interframe coding frame (P frame). The coding of the intraframe coding frame (I frame) will be explained.

In FIG. 5, the input image signal of I frame is converted by the raster/block conversion circuit 21 from the raster scanning signal into an in-block horizontal block scanning signal (in block units of 8 pixels×8 pixels), which is inputted via a data selector 23 to a discrete cosine transform (DCT) circuit 24.

The image data is then converted by the DCT circuit 24 into DCT coefficients, which are subjected to quantization and Huffman coding at an encoder 25 according to a quantizing table previously set therein. The resulting data is stored in a code memory 26.

The one frame of data stored in the code memory 26 is outputted in the form of compressed files to an external memory unit (not shown), such as a hard disk, a tape streamer, or a magneto-optical disc.

At the time of expansion, the compressed file read from the external memory unit is inputted to a decoder 27 via a code memory 26.

The decoder 27 performs Huffman decoding and inverse quantization to generate DCT coefficients.

The DCT coefficients are inputted to an inverse DCT (IDCT) circuit 28.

On the basis of the DCT coefficients, the IDCT circuit 28 converts the data into image data, which is inputted to a block/raster conversion circuit 29, which converts the image data into a raster signal.

The image signal converted into the raster signal undergoes filtering at an adaptive convolution filter 30 shown in FIG. 8, which removes the distortion of block boundary.

The filter coefficient, or the spatial frequency characteristic, of the adaptive convolution filter 30 is determined by the DCT coefficients outputted from the decoder 27.

Specifically, the adaptive convolution filter circuit 30 of FIG. 8 comprises multiple stages of multipliers 308 to 316, adders 317 to 322, delay elements 323 to 329, and coefficient selectors 301 to 307.

In FIG. 8, reference symbols K00 to K33 are filter coefficients to be selected by coefficient select signals at the coefficients selectors 301 to 307.

The image data inputted to the adaptive convolution filter circuit 30 is multiplied by the filter coefficients selected by the coefficient selectors 301 to 307 in sequence at the multipliers 308 to 316, and then the results are supplied via the delay elements 324 to 329 to the adders 317 to 322, which add them together.

Because the input image data is converted into a raster scanning signal at the block/raster conversion circuit 29 in the preceding stage, the single stage delay elements 324 to 329 are provided so that pixels D0 to D6 in a horizontally adjacent block may be filtered in sequence.

For example, when the first row in the image data is filtered horizontally, the adaptive convolution filter circuit 30 performs the following operation:

$$D0 \times K00 + D1 \times K10 + D2 \times K20 + D3 \times K30 + D4 \times K20 + D5 \times K10 + D6 \times K00$$

In this way, the distortion of block boundary has been eliminated from the image signal by filtering in blocks at the adaptive convolution filter circuit 30, and the resulting image signal is inputted to an adder circuit 32.

The adder circuit 32 is used to reconstruct the original image data from the differential frame in an interframe coding frame (P frame) explained layer. In the case of an intraframe coding frame (I frame), because the data selector 31 selects "0", the output of the adder circuit remains unchanged.

The output of the adder circuit 32 is supplied in the form of an output image signal subjected to an expansion process. The output is also written into a frame memory 33 for the next interframe coding and at the same time, is inputted to a raster/block conversion circuit 34, which converts it into a block scanning signal (8 pixels×8 pixels), which passes through a data selector 35 to a differential circuit 22.

In this case, the data selector 35 has not selected "0."

Hereinafter, the coding of interframe coding frames (P frames) will be explained.

After the difference of the input image signal from the compressed and expanded image data namely the reconstructed image data, for the previously processed frame is determined in the differential circuit 22, the result passes through the data selector 23 and is inputted to the DCT circuit 24.

The DCT circuit 24 converts the differential image data into DCT coefficients, which undergo quantization and Huffman coding at the encoder 25 on the basis of a quantization table previously set therein. The results are stored in the code memory 26.

The one frame of data stored in the code memory 26 is outputted in the form of compressed files to an external memory unit (not shown), such as a hard disk, a tape streamer, or a magneto-optical disc.

At the time of expansion, the compressed file read from the external memory unit is inputted to the decoder 27 via the code memory 26.

The decoder 27 performs Huffman decoding and inverse quantization to generate DCT coefficients.

The DCT coefficients are inputted to the IDCT circuit 28.

The IDCT circuit 28 converts the DCT coefficients into differential image data, which is inputted to a block/raster conversion circuit 29, which converts it into a raster signal.

The raster signal into which the block/raster conversion circuit 29 has converted the differential image signal, is filtered at the adaptive convolution filter 30, thereby removing the distortion of block boundary.

The coefficient, or frequency characteristic, of the adaptive convolution filter is determined by the DCT coefficients outputted from the decoder 27.

The differential image signal from which the distortion of block boundary has been removed at the adaptive convolution filter 30 is inputted to the adder circuit 32.

In this case, the image data for the preceding frame stored in the frame memory 33 is selected by the data selector 31 and added to the differential image signal at the adder circuit 32, which supplies the result as an expanded output image signal.

The output of the adder circuit 32 is also converted into a block signal at the raster/block conversion circuit 34 for the next frame processing, and the block signal is inputted to the data selector 35.

The processing of subsequent frames is the repetition of what has been explained above.

Hereinafter, the decoding procedure for reconstructing the original image signal will be explained in detail.

After the coded (compressed) data is read from the external memory unit (not shown), such as a hard disk, a tape streamer, or a magneto-optical disc and is buffered at the code memory 26, it is inputted to the decoder 27.

The decoder 27 performs Huffman decoding and inverse quantization to generate DCT coefficients.

The DCT coefficients are inputted to the IDCT circuit 28.

The IDCT circuit 28 converts the DCT coefficients into image data, which is inputted to the block/raster conversion circuit 29, which converts it into a raster signal.

The raster signal into which the block/raster conversion circuit 29 has converted the image signal is filtered at the adaptive convolution filter 30, thereby eliminating block distortion.

The filter coefficient, or spatial frequency characteristic, of the adaptive convolution filter 30, is determined by the DCT coefficients outputted from the decoder 27.

Each image signal from which the adaptive convolution filter 30 has removed the distortion of block boundary is inputted to the adder circuit 32.

At this time, in the case of an intraframe coding frame (I frame), because the data selector 31 selects "0," the output of the adder circuit 32 remains unchanged.

In the case of an interframe coding frame (P frame), the image signal for the preceding frame stored in the frame memory 33 is selected by the data selector 31 and the selected signal is added to the currently expanded image signal at the adder circuit 32, which outputs the result as a decoded image signal. The resulting signal is also written again in the frame memory 33 for the next frame processing.

In the techniques disclosed U.S. patent application Ser. No. 08/237,378, now U.S. Pat. No. 5,563,662, the compression/expansion processes are performed on a block scanning signal (8 pixels×8 pixels). For example, to effect filtering to eliminate the distortion of block boundary as disclosed in U.S. patent application Ser. No. 08/238,983, now U.S. Pat. No. 5,625,714, FIR filtering is effected at an adaptive convolution filter, so that a block/raster conversion circuit 29 must be provided in the stage before the adaptive convolution filter.

A circuit that changes the image signal processing mode as the block/raster conversion circuit 29 does, makes the control of the entire system complicated. Furthermore, such processing mode requires a memory capacity for two block lines for real-time processing. This makes the amount of delay in the actual data processing larger. As a result, a memory capacity large enough to deal with such delay is needed, making it difficult to squeeze such a memory into an integrated circuit.

Specifically, because the block/raster conversion circuit 29 must converts the block scanning (in-block horizontal) signal as shown in FIG. 6B into the raster scanning signal as shown in FIG. 6A, a memory capacity for at least one block line BL is needed as shown in FIG. 6B to obtain one line of image data for the raster scanning signal.

Furthermore, to perform a conversion process in real time, the block/raster conversion circuit 29 must effect a read operation, while effecting a write operation, so that it requires a memory capacity of a total of two block lines 2·BL.

The converting process of the next line cannot be started until one line of image data has been written and read, so that the amount of delay in the converting process is large.

In the image signal processing apparatus disclosed in U.S. patent application Ser. No. 08/237,378, now U.S. Pat. No. 5,563,662, shown in FIG. 5, because the output image signal supplied from the adder circuit 32 has been converted into a raster scanning signal at the block/raster conversion circuit 29 related to the change of processing mode in the compression/expansion processing loop, a block/raster conversion circuit for the output image signal from the adder circuit 32 is not needed, but a raster/block conversion circuit 34 for converting into a block scanning signal for the next frame processing.

SUMMARY OF THE INVENTION

It is, therefore, an object of the present invention to provide a new and improved signal processing apparatus which simplifies the control of the entire system and miniaturizes the system by achieving the easy erasing of block distortion caused in organizing the digital image signal into blocks and performing a signal compression/expansion process, thereby realizing the coding/decoding of high-quality moving pictures or still pictures.

According to the present invention, there is provided an image signal processing apparatus for processing an image signal input to convert a raster scanning signal into a block scanning signal, comprising: compression coding means for selectively compression-coding either the block scanning signal or a differential signal; expansion decoding means for expansion-decoding the block scanning signal compression-coded by the compression-coding means; first block scanning direction conversion means for changing the scanning direction of the block scanning signal expansion-decoded by the expansion decoding means from in-block horizontal to in-block vertical; filter means for removing distortion of block boundary by horizontally filtering the block scanning signal whose scanning direction is changed to in-block vertical by the first block scanning direction conversion means; second block scanning direction conversion means for changing from in-block vertical to in-block horizontal scanning direction of the block scanning signal from which the distortion of block boundary has been removed by the filter means; and differential generating means for determining the difference between the block scanning signal whose scanning direction has been changed to in-block horizontal by the second block scanning direction conversion means and the block scanning signal substantially inputted to the compression coding means, and supplying the difference as the differential signal to the compression coding means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 9 is detailed configuration of the in-block horizontal scanning/in-block vertical scanning conversion circuit in the embodiment.

DETAILED DESCRIPTION OF THE PREFERRED EMBODIMENTS

Figure 1:
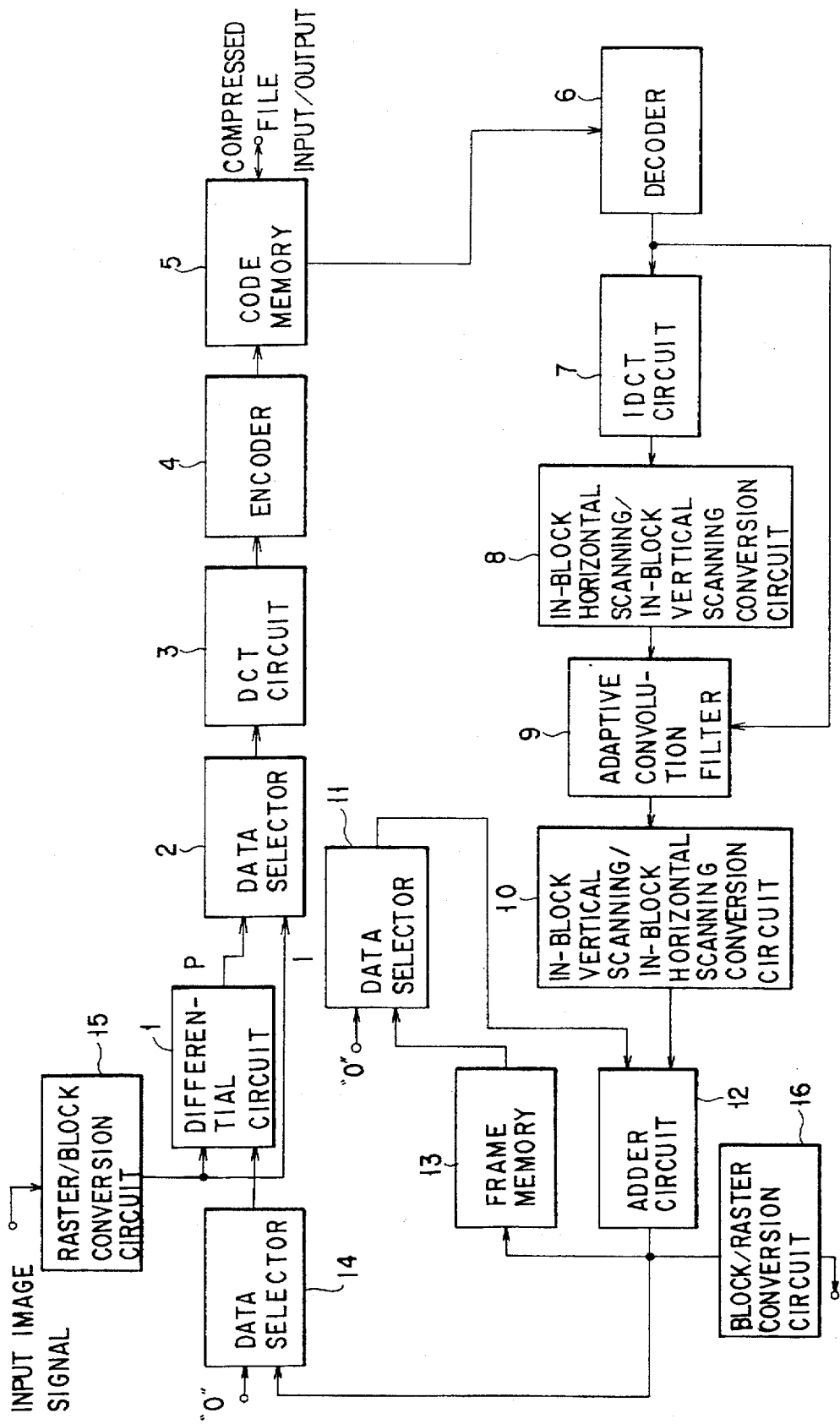
FIG. 1 is a schematic block diagram of an embodiment of an image signal processing apparatus according to the present invention.

Reference will now be made in detail to the presently preferred embodiment of the invention as illustrated in the accompanying drawings, in which like reference characters designate like or corresponding parts throughout the several drawings.

Hereinafter, referring the accompanying drawings, an embodiment of the present invention will be explained in detail.

FIG. 1 is a general configuration of an image signal processing apparatus according to an embodiment of the present invention.

The image signal processing apparatus is an example in which the filtering to remove the distortion of block boundary in the compressed image organized in blocks is applied to moving pictures and still pictures.

Figure 6A:
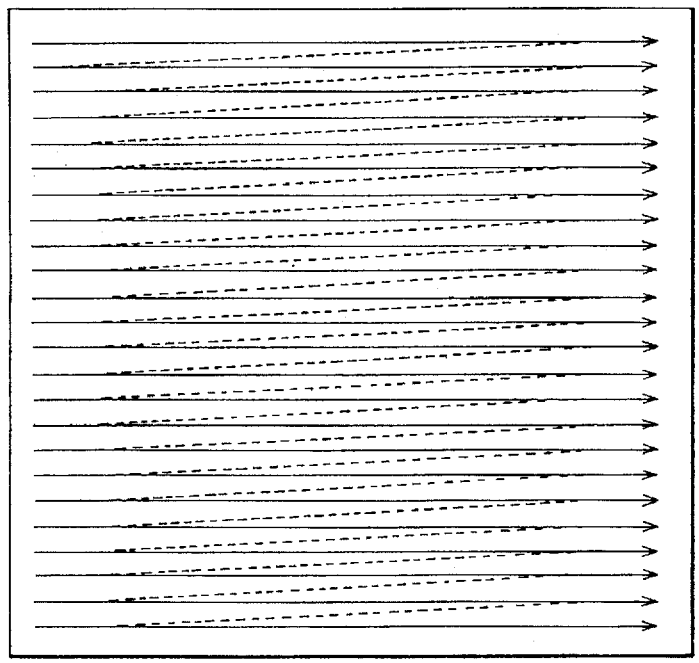
FIGS. 6A and 6B show a method of scanning a two-dimensional image in a one-dimensional manner in raster scanning.
Figure 6B:
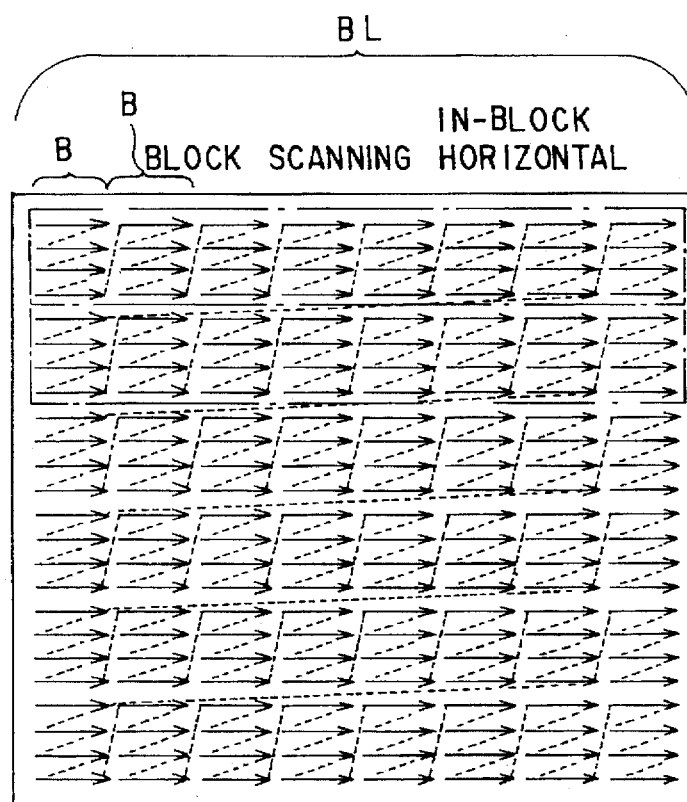

As described above, the input image signal is usually supplied in the form of the raster signal obtained from raster scanning as shown in FIG. 6A. In this embodiment, to organize a screen of image signal into blocks and compress the image in blocks, a raster/block conversion circuit 15 converts the input image signal into an in-block horizontal block scanning signal (e.g., block units of 8 pixels×8 pixels) as shown in FIG. 6B.

Figure 7:
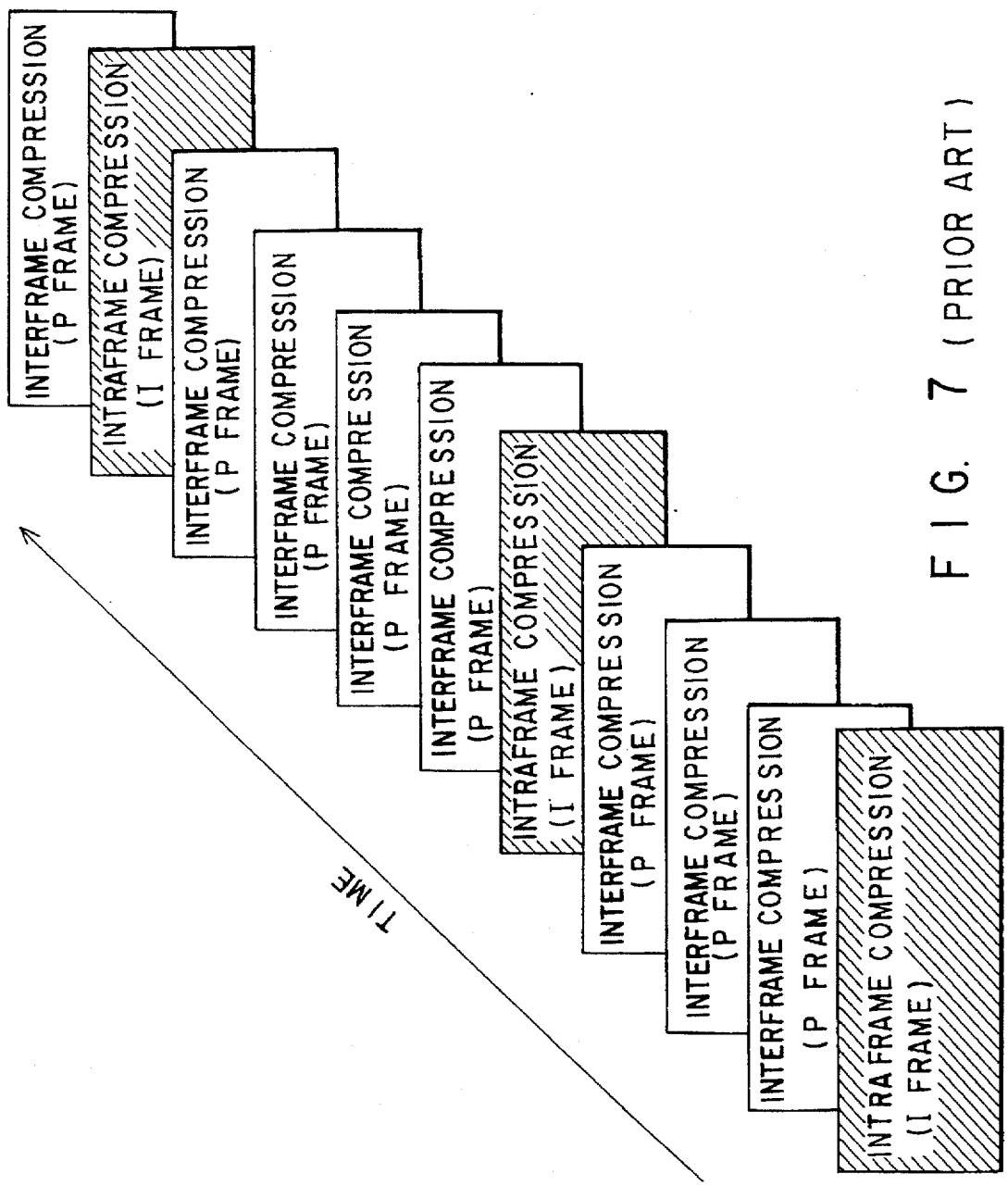
FIG. 7 shows the mode of coding each frame in the image compressing process.

The structure of the image signal is such that at least one interframe coding frame (P frame) intervenes between a plurality of intraframe coding frames (I frames) periodically with respect to time as shown in FIG. 7.

The processing of the intraframe coding frame (I frame) differs from that of the interframe coding frame (P frame). The coding of the intraframe coding frame (I frame) will be explained.

In FIG. 1, the image signal I is converted by a raster/block conversion circuit 15 into an in-block horizontal block scanning signal (in block units of 8 pixels×8 pixels), which is inputted via a data selector 2 to a DCT circuit 3.

The image data is then converted by the DCT circuit 3 into DCT coefficients, which are subjected to quantization and Huffman coding at an encoder 4 according to a quantizing table previously set therein. The resulting data is stored in a code memory 5.

The one screen of data stored in the code memory 5 is outputted in the form of compressed files to an external memory unit (not shown), such as a hard disk, a tape streamer, or a magneto-optical disc.

At the time of expansion, the compressed file read from the external memory unit is inputted to a decoder 6 via the code memory 5.

The decoder 6 performs Huffman decoding and inverse quantization to generate DCT coefficients.

The DCT coefficients from the decoder 6 are inputted to an IDCT circuit 7.

Next, the IDCT circuit 7 converts the DCT coefficients into image data, which is inputted to an in-block horizontal scanning/in-block vertical scanning conversion circuit 8, which converts the data into an in-block vertical scanning signal.

Figure 4:
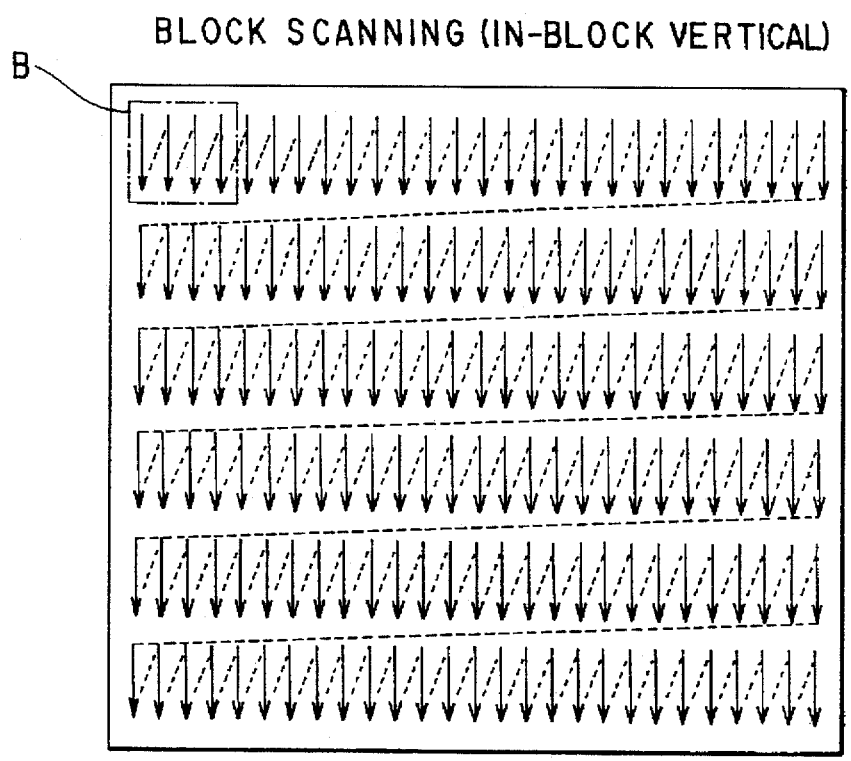
FIG. 4 is a diagram to help explain a method of scanning a two-dimensional image in blocks horizontally or vertically.

Then, the image signal converted into an in-block vertical scanning signal as shown in FIG. 4 is filtered at an adaptive convolution filter 9.

The filter coefficient, or the spatial frequency characteristic, of the adaptive convolution filter 9 is determined by the DCT coefficients outputted from the decoder 6.

The adaptive convolution filter circuit 9 for vertical block scanning comprises multiple stages of multipliers 401 to 406, adders 411 to 416, delay elements 420 to 426, and coefficient selectors 431 to 437.

Figure 2:
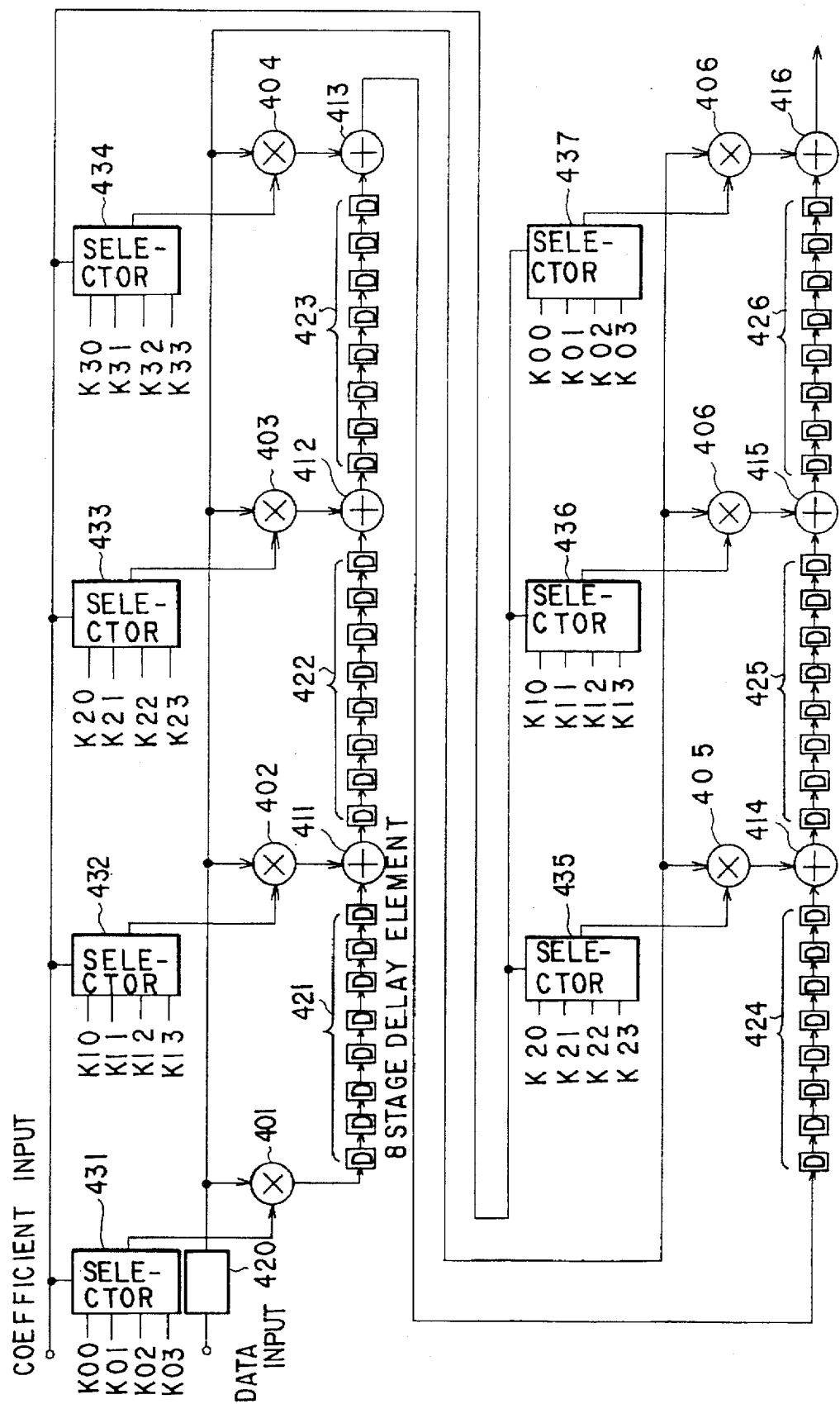
FIG. 2 is a circuit diagram of the convolution filter circuit in the embodiment.

In FIG. 2, reference symbols K00 to K33 are filter coefficients to be selected by the coefficient select signals at the coefficients selectors 431 to 437.

The image data inputted to the adaptive convolution filter circuit 9 is multiplied by the filter coefficients selected by the coefficient selectors 431 to 437 in sequence at the multipliers 411 to 416, and then the results are supplied via the delay elements 421 to 426 to the adders 411 to 416, which add them together.

To horizontally filter the image signal from in-block vertical scanning, eight stages of delay elements 421 to 426 are inserted as shown in the figure so as to add the data at intervals of 8 pixels in the vertical direction.

This corresponds to filtering adjacent pixels in raster scanning.

The image signal from which the distortion of block boundary has been removed is changed from vertical scanning to horizontal scanning in the block at an in-block vertical scanning/in-block horizontal scanning conversion circuit 10, and the resulting signal is inputted to an adder circuit 12.

The adder circuit 12 reconstructs the original image from the differential frame in an interframe coding frame (P frame). In the case of an intraframe coding frame (I frame), because a data selector 11 selects "0," the output of the adder circuit remains unchanged.

The output of the adder circuit 12 is supplied in the form of an output image via a block/raster conversion circuit 16. The output is also written into a frame memory 13 for the next interframe processing and at the same time, passes through a data selector 14 to a differential circuit 1.

Hereinafter, the coding of interframe coding frames (P frames) will be explained.

The input image signal, which is inputted in the form of an in-block horizontal block scanning signal (e.g., in block units of 8 pixels×8 pixels) into which the raster/block conversion circuit 15 has converted as shown in FIG. 6B, is inputted to the differential circuit 1. The differential circuit 1 determines the difference of the input image signal from the compressed or expanded image data for the previously processed frame. Thereafter, the result is inputted to the DCT circuit 3 via the data selector 2.

The DCT circuit 3 converts the image data into DCT coefficients, which undergo quantization and Huffman coding at the encoder 4 on the basis of a quantization table previously set therein. The results are stored in the code memory 5.

The one screen of data stored in the code memory 5 is outputted in the form of compressed files to an external memory unit (not shown), such as a hard disk, a tape streamer, or a magneto-optical disc.

At the time of expansion, the compressed file read from the external memory unit is inputted to the decoder 6 via the code memory 5.

The decoder 6 performs Huffman decoding and inverse quantization to generate DCT coefficients.

The DCT coefficients output from the decoder 6 are inputted to the IDCT circuit 7.

The IDCT circuit 7 converts the DCT coefficients into image data, which is inputted to an in-block horizontal scanning/in-block vertical scanning conversion circuit 8, which converts it into an in-block vertical scanning signal as shown in FIG. 4.

The image signal converted into the in-block vertical scanning signal is filtered at the adaptive convolution filter 9, thereby removing the distortion of block boundary.

The coefficient, or the spatial frequency characteristic, of the adaptive convolution filter 9 is determined by the DCT coefficients outputted from the decoder 6.

The differential image signal from which the distortion of block boundary has been eliminated by the adaptive convolution filter 9 for vertical block scanning of FIG. 2 used in the present embodiment, changes its scanning direction from vertical to horizontal at the in-block vertical scanning/in-block horizontal scanning conversion circuit 10 and the resulting signal is inputted to the adder circuit 12.

At this time, the image data for the preceding frame stored in the frame memory 13 is selected by the data selector 11 and the selected image data is added to the differential image signal at the adder circuit 12. The resulting signal is supplied as an output image signal via the block/raster conversion circuit 16.

The output of the adder circuit 12 is inputted to the frame memory 13 and data selector 14 for the next frame processing.

Thereafter, subsequent frames are processed by repetition of the above-described processes.

Because the in-block vertical scanning/in-block horizontal scanning conversion circuit 10 only converts the block scanning (in-block vertical) signal as shown in FIG. 4 into the block scanning (in-block horizontal) signal as shown FIG. 6B, it has only to have a memory capacity for one block B as shown in FIG. 4.

Hereinafter, the decoding process of reconstructing the original image signal will be explained in more detail.

First, the coded (compressed) data is read from the external memory unit (not shown), such as a hard disk, a tape streamer, or a magneto-optical disc and then is inputted to the decoder 6 via the code memory 5.

The decoder 6 performs Huffman decoding and inverse quantization to generate DCT coefficients.

The DCT coefficients from the decoder 6 are inputted to the IDCT circuit 7.

The IDCT circuit 7 converts the DCT coefficients into image data, which is inputted to the in-block horizontal scanning/in-block vertical scanning conversion circuit 8, which converts it into an in-block vertical scanning signal.

The image signal converted into the in-block vertical scanning signal is filtered at the adaptive convolution filter 9, thereby eliminating block distortion.

The filter coefficient, or the spatial frequency characteristic, of the adaptive convolution filter 9, is determined by the DCT coefficients outputted from the decoder 6.

The image signal from which the adaptive convolution filter 9 for vertical block scanning as shown in FIG. 2 in the present embodiment has removed the distortion of block boundary, changes its scanning direction in the block to vertical at the in-block vertical scanning/in-block horizontal scanning conversion circuit 10, and the resulting signal is inputted to the adder circuit 12.

In the case of an intraframe coding frame (I frame), because the data selector 11 selects "0," the output of the adder circuit 12 remains unchanged.

In the case of an interframe coding frame (P frame), the image signal for the preceding frame stored in the frame memory 13 is selected by the data selector 11 and the selected signal is added to the image signal of the present frame at the adder circuit 12, which outputs the result as an output image signal.

The output of the adder circuit 12 is written again in the frame memory 13 for the next frame processing and at the same time, inputted to the data selector 14.

Hereinafter, the adaptive convolution filter 9 for vertical block scanning shown in FIG. 2 will be explained in more detail.

Figure 3:
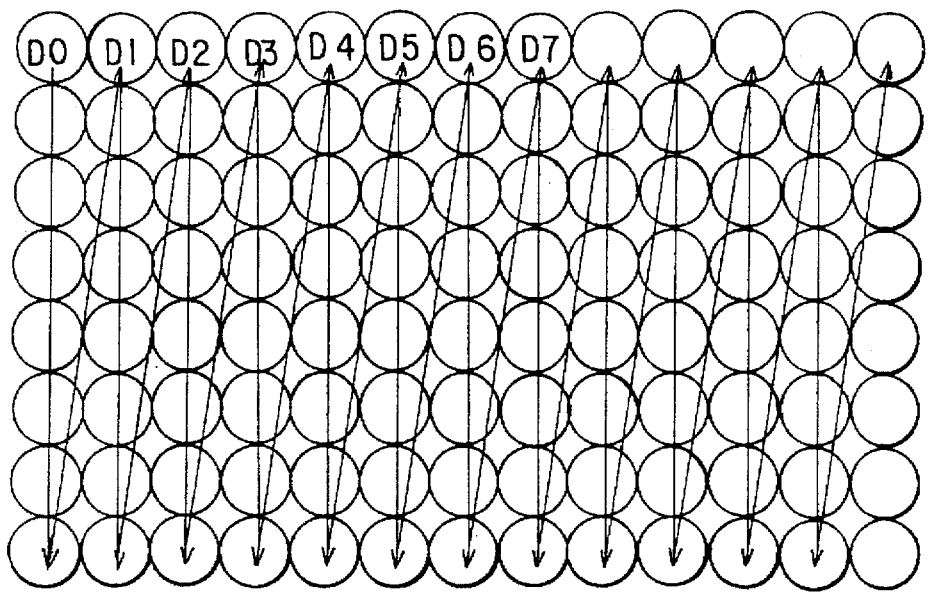
FIG. 3 is a diagram to help explain the operation of the convolution filter.
Figure 8:
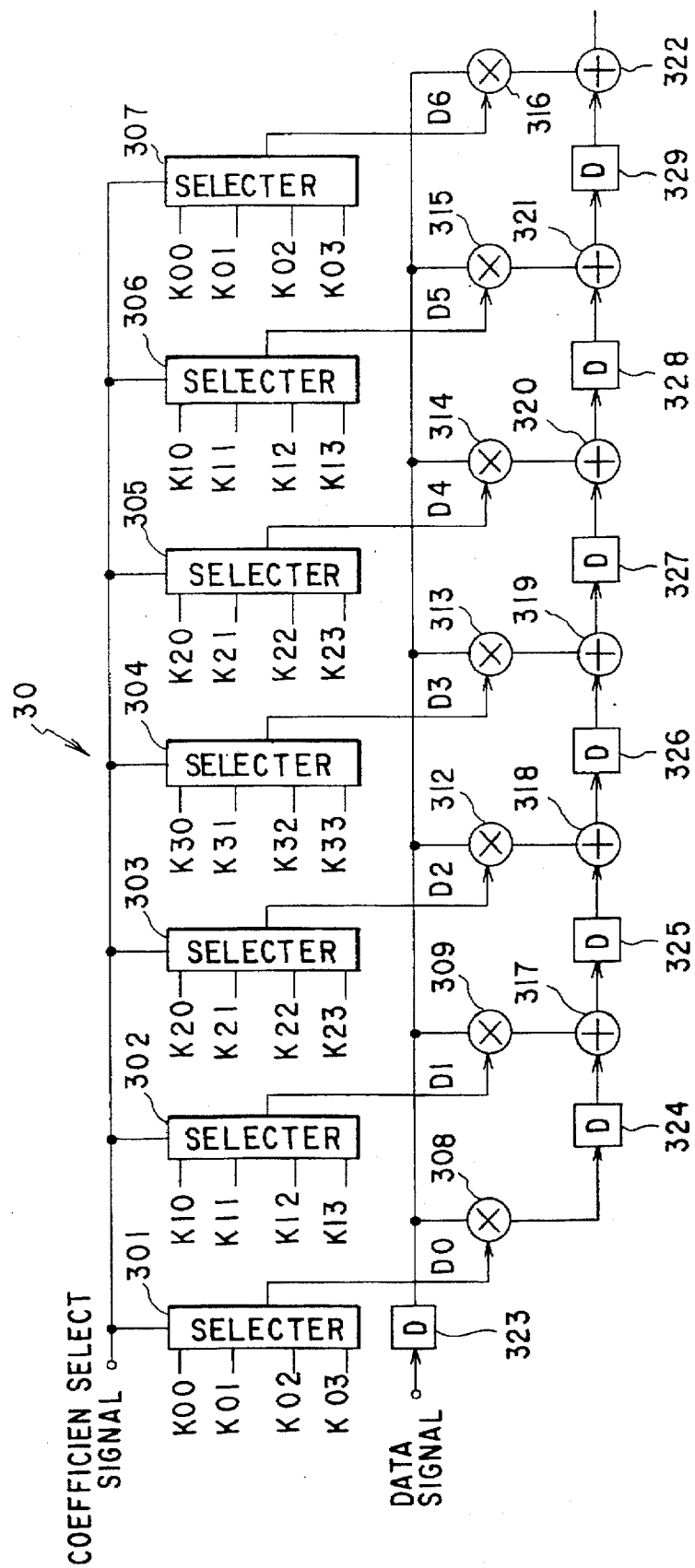
FIG. 8 is a block diagram of a conventional convolution filter circuit.

For the image data as shown in FIG. 3, when the first row in the image data is filtered horizontally, the following operation is performed as in FIG. 8:

$$D0 \times K00 + D1 \times K10 + D2 \times K20 + D3 \times K30 + D4 \times K20 + D5 \times K10 + D6 \times K00$$

For example, in the case of 8 pixels×8 pixels vertical block scanning, 7 pixels of data intervene vertically between pixels D0 and D1, between pixels D1 and D2, between pixels D2 and D3, between pixels D3 and D4, between D4 and D5, and between D5 and D6. Therefore, use of 8 stages of delay elements 421 to 426 results in the equivalent effect to filtering adjacent pixels in raster scanning.

While in U.S. patent application Ser. No. 08/237,378, now U.S. Pat. No. 5,563,662, the block/raster conversion circuit 29 requires a memory for two block lines 2·BL, the in-block horizontal scanning/in-block vertical scanning conversion circuit 9 of the present embodiment requires a memory for one block B, thereby making the circuit smaller, reducing a delay in data processing, and facilitating the control of the entire system.

With the present invention, because only the block scanning signal is handled throughout the entire compression/expansion processing loop without changing the image signal processing mode, the in-block horizontal scanning/in-block vertical scanning conversion circuit 8 used in the preceding stage of the adaptive convolution filter circuit 30 has only to convert the block scanning (in-block horizontal) signal of FIG. 6B into the block scanning (in-block vertical) signal of FIG. 4.

Therefore, the scanning conversion circuit has only to have a memory capacity for one block B as shown in FIG. 6B.

Even taking into account real time processing, it has only to have a memory capacity for two blocks 2·B.

FIG. 9 is a detailed configuration of the in-block horizontal scanning/in-block vertical scanning conversion circuit 8.

The image data from the IDCT circuit 7 as shown in FIG. 1 is directed to the direction of a first dual port memory 82 with a multiplexer 81 and stored in the first dual port memory 82 input horizontal direction addresses by a first address generator 83, in a first one block unit.

At the end of the first one block storing, one block of image data stored in the first dual port memory 82 is read out therefrom, since the first address generator 83 supplies vertical direction address to the first dual port memory 82.

At the same time, the image data directed to the direction of a second dual port memory 85 by the multiplexer 81 is stored in the second dual port memory 85 input horizontal direction addresses by a second address generator 86, in a next one block unit.

At the end of the next one block storing, one block of image data stored in the second dual port memory 85 is read out therefrom, since the second address generator 83 supplies vertical direction addresses to the second dual port memory 85.

Each one block of image data read out from the first and second dual port memories 82 and 85 is supplied to the adaptive convolution filter 9 as shown in FIG. 1 through a selector 84, reciprocally. Thereafter, subsequent blocks are processed by repetition of the above-described processes.

Furthermore, a detailed configuration of the in-block vertical scanning/in-block horizontal scanning conversion circuit 10 is similar to that of the in-block horizontal scanning/in-block vertical scanning conversion circuit 8 as shown in FIG. 9.

In this case, the first and second address generators 83 and 86 generate the vertical direction addresses and the horizontal direction addresses in reverse order that of the above case.

The gist of the above embodiment is as follows:

(1) An image processing apparatus characterized in that after the compressed input moving pictures continuous in time has been decoded, the scanning direction of the image signal divided into specific blocks is changed from the in-block horizontal to the in-block vertical and then the decoded data is supplied to the convolution filter.

Therefore, the image processing apparatus makes it possible to render the memory capacity smaller. While the block/raster conversion circuit 29 in U.S. patent application Ser. No. 08/237,378, now U.S. Pat. No. 5,563,662, uses a memory for two block lines 2·BL, the in-block horizontal scanning/in-block vertical scanning conversion circuit 8 in the present embodiment needs a memory capacity for one block B, thereby making it possible to render the circuit smaller and facilitating the control of the system.

(2) An image processing apparatus characterized in that after the still picture subjected to compression has been decoded, the scanning direction of the image signal divided into specific blocks is changed from the in-block horizontal to the in-block vertical and then the decoded data is supplied to the convolution filter.

Therefore, as with item (1), the image processing apparatus of such a configuration makes it possible to render the memory capacity smaller. While the block/raster conversion circuit 29 in U.S. patent application Ser. No. 08/237,378, now U.S. Pat. No. 5,563,662, uses a memory for two block lines BL, the in-block horizontal scanning/in-block vertical scanning conversion circuit 8 of the present configuration needs a memory capacity for one block B, thereby making it possible to render the circuit smaller and facilitating the control of the system.

(3) An image processing apparatus in which the convolution filter is a filter for vertical block scanning and effects filtering by performing operation at intervals of delay means for n pixels when the image compression process is carried out in block units of n×n pixels.

Thus, with the image processing apparatus, the convolution filter provides a delay of n pixels during the product sum operation of each pixel and thereby achieves direct filtering without converting the block scanning signal into the raster scanning signal, resulting in the same effect of filtering horizontally adjacent pixels in raster scanning.

Figure 5:
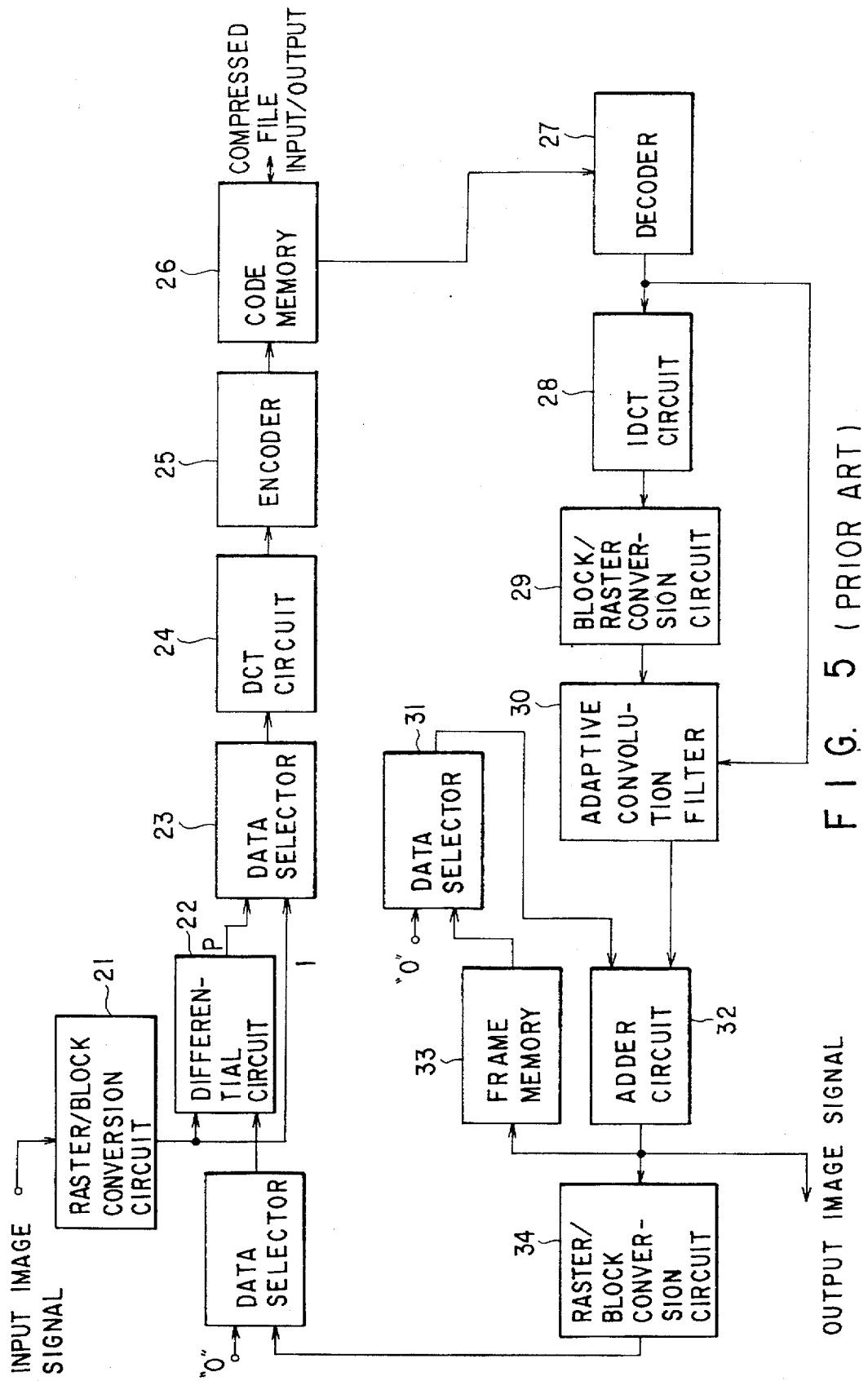
FIG. 5 is a block diagram of a conventional moving-picture processing apparatus.

With an image signal processing apparatus of the present invention, because only the block scanning signal is handled throughout the entire compression/expansion processing loop without changing the image signal processing mode, the block/raster conversion circuit 16 for the output of the adder circuit 12 is needed, but the raster/block conversion circuit 34 for the next frame processing of FIG. 5 disclosed in U.S. patent application Ser. No. 08/237,378, now U.S. Pat. No. 5,563,662, is not required.

As described above in detail, with the present invention, to easily remove block distortion caused in organizing the digital image signal into blocks and performing the signal compression/expansion process, after the composition of the image data, the scanning direction in the block is changed from horizontal to vertical and the resulting data is supplied to the convolution filter. This reduces the memory capacity needed by the conversion circuit to a memory capacity for one block, making the entire system smaller.

Accordingly, with the present invention, it is possible to provide an image signal processing apparatus which makes the system smaller, while simplifying the control of the entire system, and realizes the coding and decoding of high-quality moving pictures or still pictures.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. An image signal processing apparatus for processing an image signal input to convert a raster scanning signal into a block scanning signal, comprising:

compression coding means for selectively compression-coding either said block scanning signal or a differential signal;

expansion decoding means for expansion-decoding the block scanning signal compression-coded by said compression-coding means;

first block scanning direction conversion means for changing the scanning direction of the block scanning signal expansion-decoded by said expansion decoding means from in-block horizontal to in-block vertical;

filter means for removing distortion of block boundary by horizontally filtering the block scanning signal whose scanning direction is changed to in-block vertical by said first block scanning direction conversion means;

second block scanning direction conversion means for changing from in-block vertical to in-block horizontal the scanning direction of the block scanning signal from which the distortion of block boundary has been removed by said filter means; and differential generating means for determining the difference between the block scanning signal whose scanning direction has been changed to in-block horizontal by said second block scanning direction conversion means and said block scanning signal substantially inputted to said compression coding means, and supplying the difference as said differential signal to said compression coding means.

2. An image signal processing apparatus according to claim 1, wherein said compression coding means includes a data selector that selects said block scanning signal only when a first frame is coded and selects said differential signal when the frames after the first frame are coded.

3. An image signal processing apparatus according to claim 2, wherein said compression coding means includes a DCT circuit for converting an output from said data selector into DCT coefficients, an encoder for quantizing and Huffman-coding the DCT coefficients from the DCT circuit, and a code memory for storing an output from the encoder.

4. An image signal processing apparatus according to claim 3, wherein said expansion decoding means includes a decoder for Huffman-decoding and inverse-quantizing an output from said code memory and outputting DCT coefficients and an IDCT circuit for converting the DCT coefficients from the decoder into a block scanning image signal.

5. An image signal processing apparatus according to claim 4, wherein said filter means includes an adaptive convolution filter with a spatial frequency characteristic determined by the DCT coefficients from said decoder.

6. An image signal processing apparatus according to claim 5, wherein said adaptive convolution filter comprises:

a plurality of coefficient selectors for each selectively outputting a specific filter coefficient from a plurality of filter coefficients according to a coefficient select signal;

a plurality of multipliers for each multiplying individual filter coefficients from said plurality of coefficient selectors by said block scanning image signal;

a plurality of adders for each adding outputs from said plurality of multipliers in sequence; and a plurality of delay means for each causing a delay of as many pixels as there are in the vertical direction of said block scanning image signal so that product sum operation by said plurality of multipliers and said plurality of adders may be performed on a specific number of pixels arranged in the horizontal direction of said block scanning image signal.

7. An image signal processing apparatus according to claim 6, wherein each of said plurality of delay means includes n delay elements when said block scanning image signal is in block units of n×n pixels.

8. An image signal processing apparatus according to claim 2, wherein said differential generating means includes a frame memory for storing one frame of image data output by said filter means, a second data selector for selecting an output from the frame memory during interframe coding and selecting "0" during intraframe coding, an adder circuit for adding an output from the second data selector to an output of said filter means and supplying an adding output to said frame memory, a third data selector for selecting "0" when a first frame is coded and selecting the adding output from said adder circuit when the frames after the first frame are coded, and a differential circuit for determining the difference between an output from the third data selector and said block scanning signal inputted to said compression coding means.

9. An image signal processing apparatus according to claim 1, wherein said image signal includes a moving picture signal.

10. An image signal processing apparatus according to claim 1, wherein said image signal includes a still picture signal.

* * * * *